Figure 1:
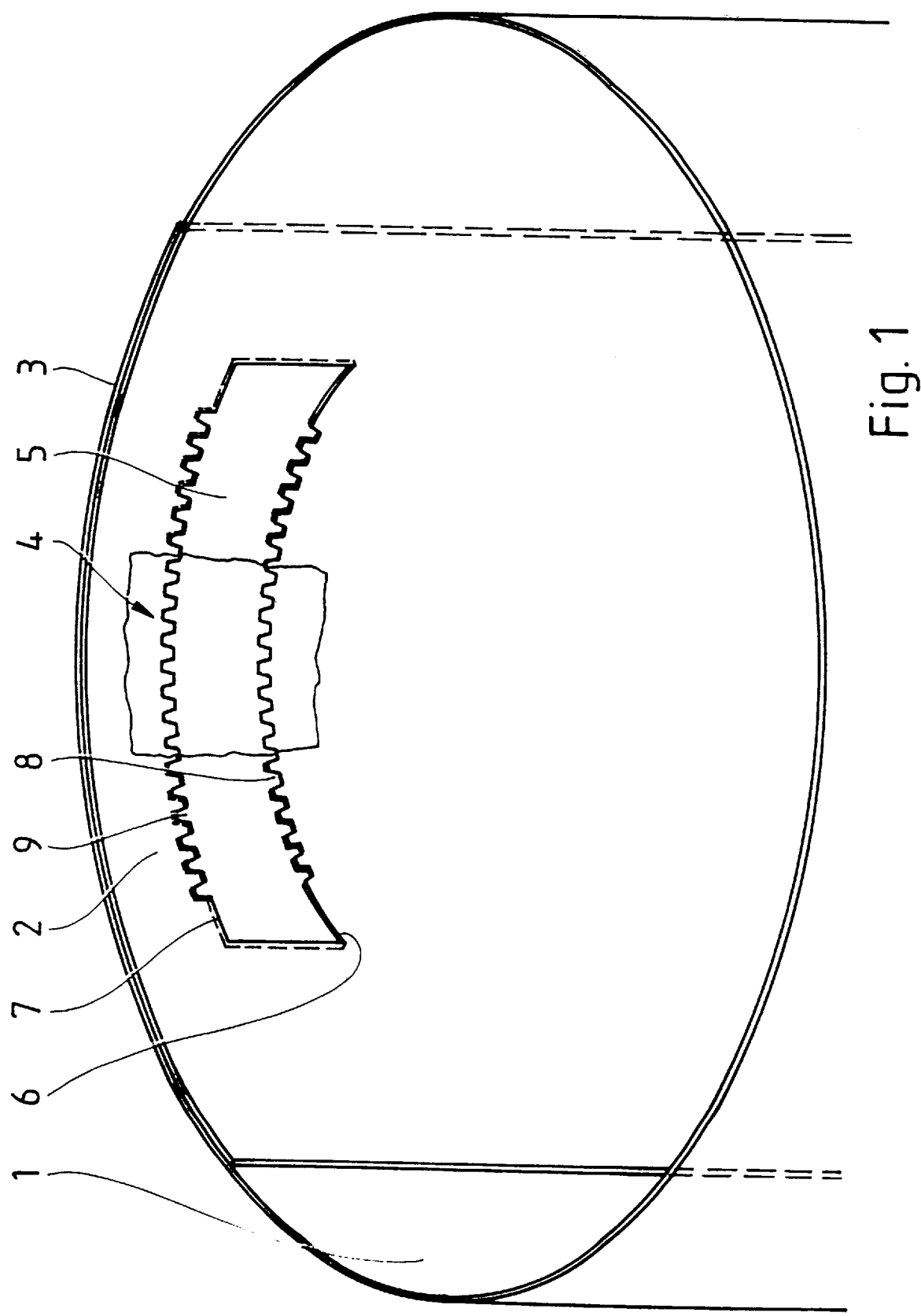

United States Patent [19]
Graf et al.

[11] Patent Number: 5,769,459
[45] Date of Patent: Jun. 23, 1998

[54] INSIDE SEALING DEVICE SLEEVE FOR INSERTION OF PIPES

[75] Inventors: Eckhard Graf; Juergen Graf, both of Bad Duerrheim, Germany

[73] Assignee: Uhrig Kanaltechnik GmbH, Geisingen, Germany

[21] Appl. No.: 860,998

[22] PCT Filed: Nov. 12, 1996

[86] PCT No.: PCT/EP96/05146

§ 371 Date: Jul. 11, 1997

§ 102(e) Date: Jul. 11, 1997

[87] PCT Pub. No.: WO97/21054

PCT Pub. Date: Jun. 12, 1997

[30] Foreign Application Priority Data

Dec. 1, 1995 [DE] Germany .......................... 195 44 877.4

[51] Int. Cl.$^6$ .................................................. F16L 55/162
[52] U.S. Cl. .............................. 285/15; 138/97; 285/397; 285/370; 285/373
[58] Field of Search ........................... 138/97, 98; 285/15, 285/397, 370, 373, 258; 405/150.1, 154, 156, 157

[56] References Cited

U.S. PATENT DOCUMENTS

| 3,960,395 | 6/1976 | Cirule et al. | 285/370 |
| 4,647,072 | 3/1987 | Westman | 285/15 |
| 5,465,758 | 11/1995 | Graf et al. | 138/98 |
| 5,507,500 | 4/1996 | Skinner et al. | 285/397 |
| 5,549,334 | 8/1996 | Zeisler et al. | 285/370 |

FOREIGN PATENT DOCUMENTS

| 3938390 | 5/1991 | Germany . | |
| 9318409 U | 3/1994 | Germany . | |
| 4401318 | 3/1995 | Germany . | |
| 9417247 U | 5/1995 | Germany . | |
| 317843 | 11/1969 | Sweden | 285/370 |

*Primary Examiner*—Eric K. Nicholson
*Attorney, Agent, or Firm*—Spencer & Frank

[57] ABSTRACT

An inside sealing sleeve 1 comprised of an expandable steel band for insertion in leaking pipes in need of repair is provided with an arresting arrangement 4 which permits very small detent steps. For this purpose, the internal band end 2 is provided with a slot 5 having two rows of teeth 8, 9, while a tensioning pinion 10, a guide pinion 11 and a locking pinion 12 are rotatably seated on the external band end 3. A tensioning spring 17 engages the pivot axle of the locking pinion 12, it keeps the locking pinion 12 in engagement with the guide pinion 11 and pushes it into the gap 21 between locking pinion 10 and guide pinion 11.

5 Claims, 2 Drawing Sheets

INSIDE SEALING DEVICE SLEEVE FOR INSERTION OF PIPES

The invention relates to an inside sealing sleeve for insertion in pipes for the purpose of sealing leakage points, comprising an expandable band made from sheet steel bent together in the shape of a ring whose band ends overlap in the circumferential direction, having at least one arresting arrangement in the form of a slot arranged on the internal band end in the circumferential direction, with the one longitudinal edge of the slot supporting a row of teeth, and having a tensioning pinion which is rotatably seated on the external band end, which tensioning pinion engages the row of teeth, and having a detent element which is under the action of a spring element and which engages the toothing of the tensioning pinion.

The invention is applied for the reconstruction of pipelines. With the assistance of inside sealing sleeves, leaky points of underground pipes made from concrete or from another material can be repaired without digging.

It is known to seal leakage points of pipes from the inside of the pipe. This is accomplished with sleeves which are bent together in helical fashion, rubber-coated and provided with special sealing rings and which are made from resilient, corrosion-resistant sheet steel and which are inserted into the pipe to be sealed up to the point of the leakage. There, they are expanded by means of an inflatable air cushion or a mechanical mounting device until they come to rest very closely against the inner pipe wall while the sealing rings are being pressed together. An arresting arrangement comprising a pinion meshing with a row of teeth and a resilient locking bolt engaging the teeth of the pinion holds the sealing sleeve in its expanded position. Here, the disadvantage, however, is that, due to the predetermined pinion toothing, the achievable detent steps of the pinion are so large that—once the sleeve has been expanded up to the limit load—the circumference of the sleeve is inevitably reduced again by up to a whole detent step, thus calling into question the desired sealing and the pressing together of the seals for lack of tight pressing contact against the inner pipe wall (DE 44 01 318 A1, DE 93 18 409 U1).

It is the object of the invention to design an inside sealing sleeve comprising an arresting arrangement which allows very small detent steps and which, once the expansion has taken place, thus ensures a tight, lasting contact against the inner pipe wall while there is a high pressing action on the sealing members.

To accomplish this object, an inside sealing sleeve of the design described at the outset is used as a basis, and the object is solved by the characterizing features of patent claim 1.

With the assistance of the locking pinion, which is under the action of the tensioning spring and acts as a bolt, it is accomplished that, once the expansion has taken place, the tension of the inside sealing sleeve remains almost totally intact after the locking bolt has locked in the tensioning pinion, which is the precondition for excellent sealing of the leakage point.

Advantageous features of the subject matter of the invention ensue from the dependent claims 2 to 5.

Figure 2:
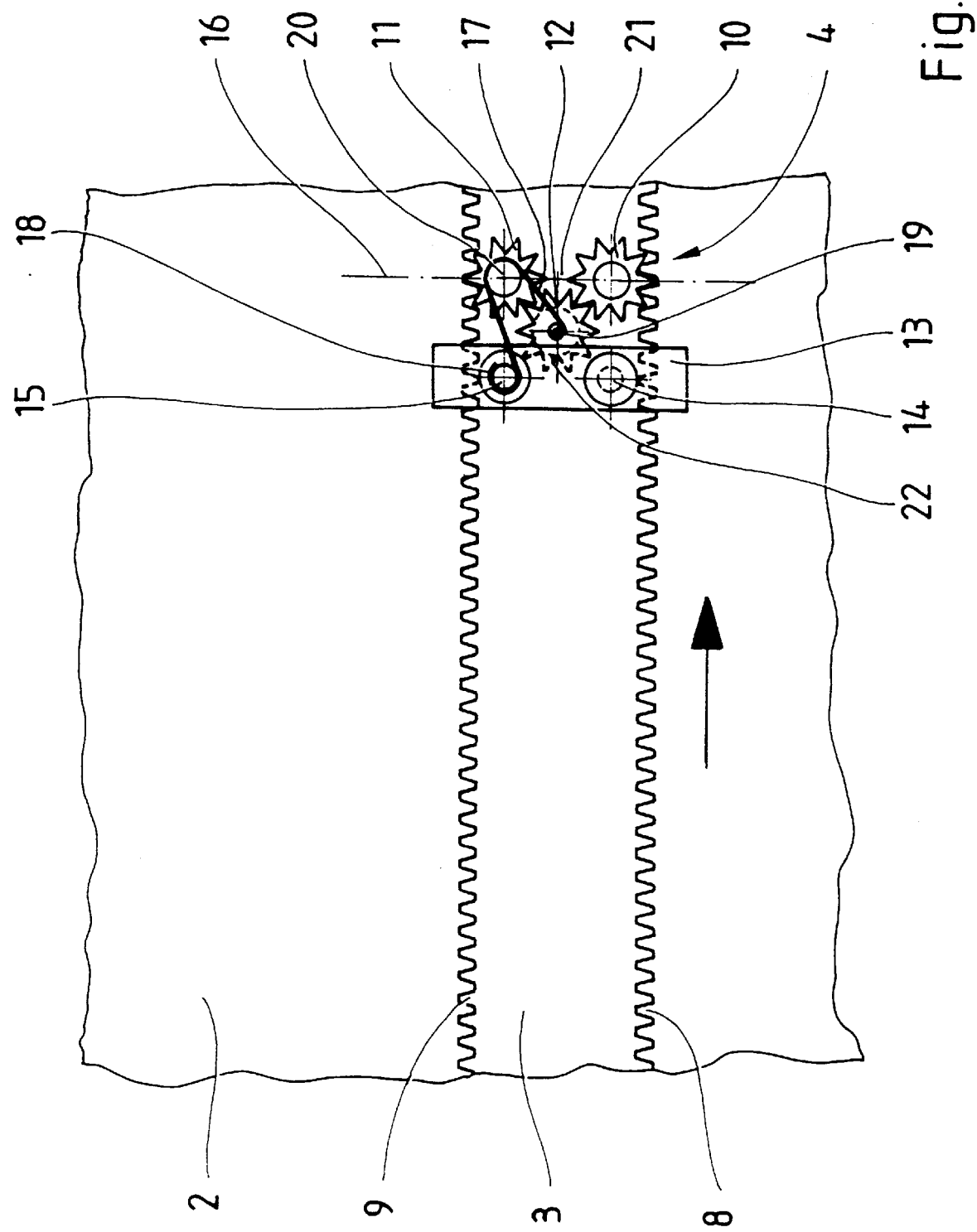

The invention is explained below in greater detail by way of the attached drawing sheets. These show:

FIG. 1 a partial view of an inside sealing sleeve, shown in perspective;

FIG. 2 a section of the sealing sleeve according to FIG. 1 with the arresting arrangement, in a plan view as indicated in FIG. 1, in an enlarged scale.

The illustrated inside sealing sleeve 1 intended for insertion in pipes for the sealing of leakage points is made of a resilient material, preferably a sheet metal piece made from stainless steel, and it has the shape of a band of smaller or greater width bent together in the manner of a ring whose external band end 3 overlaps the internal band end 2 over a large section in the circumferential direction. This sealing sleeve 1 can be expanded at the leakage point by suitable apparatuses so that it rests tightly against the inside of the pipe that is to be sealed.

Advisably, the inside sealing sleeve 1 is completely covered by a tube (not shown) made from rubber-elastic, stable material; in the region of its two ends, the inside sealing sleeve can support at least one circumferentially extending sealing band (not shown) on this tube.

The sealing sleeve 1 is provided with an arresting arrangement 4 having a detent member whose task it is to lastingly hold the sleeve in the expanded state once the expansion has taken place. This arresting arrangement 4 is comprised of a wide slot 5 provided on the internal band end 2 in the circumferential direction, with the two longitudinal edges 6 and 7 of the slot supporting identically configured rows of teeth 8 and 9, of a tensioning pinion 10, a guide pinion 11 and a locking pinion 12.

The tensioning pinion 10 is rotatably seated on the external band end 3 and engages the one row of teeth 8. The guide pinion 11 is also rotatably seated on the outer band end 3 at a distance next to the tensioning pinion 10 and meshes with the second row of teeth 9 of the slot 5 which is disposed opposite of the first row of teeth 8.

The locking pinion 12 serves as detent member which is under the action of a spring element and engages the toothing of the tensioning pinion 10. This locking pinion 12 rests on the external band 3 so as to be rotatable and can be displaced along its surface, with the pivot axle of the locking pinion 12 always being perpendicular to the surface of the external band end 3. A hold-down device 13 is fastened with two pins 14, 15 on the external band end 3. It rises above the two longitudinal edges 6 and 7 of the slot 5, partially covers the locking pinion 12 and serves to guide the locking pinion during its displacement.

The tensioning pinion 10, the guide pinion 11 and the locking pinion 12 each have the same number of teeth. The connecting line 16 of the pivot axles of tensioning pinion 10 and guide pinion 11 is perpendicular to the longitudinal axis of the slot 5.

The tensioning pinion 10 is higher than the guide pinion 11 and the locking pinion 12 and rises above these in the axial direction by at least double the amount. This makes it possible for an operating arrangement (not illustrated)—for example, in the form of a socket of a tool bit of a screwdriver tool—to grasp the tensioning pinion 10 and to drive it, thus resulting in the expansion of the inside sealing sleeve 1. This expansion, however, can also take place by means of an inflatable air bag inserted into the inside sealing sleeve; in this case, tensioning pinion 10, guide pinion 11 and locking pinion 12 are of the same height.

The spring element, which acts upon the locking pinion 12, is a tensioning spring 17 curved in a U shape, which is fastened on the external band end 3, namely on the pin 15 which is, for example, fastened by rivets, for which purpose the spring is provided with an eyelet 18. With its free end, which is bent at a right angle, the tensioning spring 17 extends into a centered bore in the locking pinion 12.

The tensioning spring 17 is wrapped around the axle stub 20 of the guide pinion 11, which has the effect that the tensioning spring keeps the locking pinion 12 during its displacements in permanent engagement with the guide pinion 11 and produces a forced guidance of the locking pinion 12 as planet wheel around the guide pinion 11. At the same time, the tensioning spring 17 pushes the locking pinion 12 into the gap 21 between the tensioning pinion 10 and the guide pinion 11 in a resilient manner, which gap is smaller than the diameter of the root circle 22 of the locking pinion 12.

The function and the operation of the arresting arrangement is as follows:

The tensioning pinion 10 moves along the row of teeth 8 of the internal band end by means of turning and displaces the outer band end 3 during this process.

Since the arrangement is mounted on the external band end 3, the entire arrangement also moves relative to the internal band end 2. During this process, the guide pinion 11 forcibly rolls along the second row of teeth 9. The locking pinion 12 is also forced into a rotational movement because of the fixed coupling between guide pinion 11 and locking pinion 12.

Thus, the locking pinion 12 forcibly rotates in the same direction of rotation as the tensioning pinion 10; for this reason, the two pinions cannot remain in engagement during their movement.

If an attempt is made to rotate the tensioning pinion 10 in the locking direction, opposite forces develop which block one another at the engagement points between the tensioning pinion 10 and the locking pinion 12 as well as between the guide pinion 11 and the locking pinion 12. Thus, the mechanism holds the two band ends 2 and 3 in their present position.

If the tensioning pinion 10 is to be rotated in the tensioning direction, then the geometric conditions of the arresting arrangement permit the locking pinion 12 to avoid the tensioning pinion 10: The tensioning pinion 10 and the locking pinion 12 rotate in the same direction, with the locking pinion 12 thus being pushed out of the engagement with the tensioning pinion 10 counter to the spring force of the tensioning spring 17 and again jumping into the engagement with the tensioning pinion 10 after being offset by respectively one tooth. While the pivot axle of the locking pinion 12 is being displaced, the guide pinion 11 and the tensioning pinion 10 continue to rotate counter to one another and remain in engagement.

This means that, during a rotation of the tensioning pinion 10, each tooth of the tensioning pinion 10 is arrested once at the point of engagement. Simultaneously, the locking pinion 12 rotates and is also arrested according to the number of teeth of the guide pinion 11. Since this relates to the teeth being offset—and not rolled—at the point of engagement and since the teeth move counter to one another, the number of detent steps is added together.

Compared to known arrangements, this mechanism therefore has twice the number of detent steps or—depending on the geometry—a multiple number of detent steps.

We claim:

1. An inside sealing sleeve for insertion in pipes for the purpose of sealing leakage points, comprising an expandable band made from sheet steel bent together in the shape of a ring whose band ends overlap in the circumferential direction, having at least one arresting arrangement in the form of a slot arranged on the internal band end in the circumferential direction, with one longitudinal edge of the slot supporting a row of teeth, and having a tensioning pinion which is rotatably seated on the external band end, which tensioning pinion engages the row of teeth, and having a detent element which is under the action of a spring element and which engages the toothing of the tensioning pinion, characterized by the following features:

a second row of teeth (9) on a second longitudinal edge of the slot, which second row of teeth is disposed opposite of the first row of teeth, a guide pinion, which is rotatably seated at a distance next to the tensioning pinion on a external band end and which meshes with the second row of teeth, a locking pinion as detent element which is arranged so as to be rotatable and displaceable next to the tensioning pinion and the guide pinion on the external band end, a tensioning spring as the spring element which is fastened on the external band end (3) and engages a pivot axle of the locking pinion (12) with its free end, the tensioning spring holds the locking pinion in engagement with the guide pinion, the tensioning spring pushes the locking pinion into the gap between tensioning pinion and guide pinion.

2. An inside sealing sleeve according to claim 1, characterized by a hold-down device which is fastened on the external band end, which hold-down device extends across the longitudinal edges of the slot and under which the locking pinion is displaceable.

3. An inside sealing sleeve according to claim 1, characterized in that tensioning pinion, guide pinion and the locking pinion each have the same number of teeth.

4. An inside sealing sleeve according to claim 1, characterized in that a connecting line of pivot axles of tensioning pinion and guide pinion is perpendicular to the longitudinal axis of the slot.

5. An inside sealing sleeve according to claim 1, characterized in that the tensioning pinion is at least twice as thick, in an axial direction, as the guide pinion and the locking pinion.

* * * * *

UNITED STATES PATENT AND TRADEMARK OFFICE
CERTIFICATE OF CORRECTION

PATENT NO. : 5,769,459
DATED : June 23, 1998
INVENTOR(S) : GRAF et al

It is certified that error appears in the above-indentified patent and that said Letters Patent is hereby corrected as shown below:

On the title page, item [22], the PCT filing date should read --November 22, 1996--.

Signed and Sealed this

Third Day of November, 1998

Attest:

BRUCE LEHMAN

Attesting Officer

Commissioner of Patents and Trademarks